United States Patent [19]
Countryman

[11] 3,721,750
[45] March 20, 1973

[54] STRAPPING FASTENER

[75] Inventor: Albert J. Countryman, Mohawk, N.Y.

[73] Assignee: Ty-Lok Assembly Systems Inc., Ilion, N.Y.

[22] Filed: June 9, 1971

[21] Appl. No.: 151,517

Related U.S. Application Data

[60] Division of Ser. No. 6,084, Jan. 27, 1970, Pat. No. 3,633,633, which is a continuation-in-part of Ser. No. 831,527, June 9, 1969, abandoned.

[52] U.S. Cl. ............... 174/135, 24/16 R, 24/30.5 R, 24/74 A, 24/129 R, 24/200, 24/265 R, 174/138 R
[51] Int. Cl. .... B65b 13/24, B65d 63/14, A44b 11/04
[58] Field of Search .... 174/40 CC, 72 A, 135, 138 R; 24/16 R, 16 PB, 22, 23 R, 23 B, 30.5 R, 30.5 P, 74 A, 81 F, 123 A, 123 D, 128 R, 129 R, 129 B, 129 D, 198, 199, 200, 265 R

[56] References Cited

UNITED STATES PATENTS

| | | | |
|---|---|---|---|
| 57,945 | 9/1866 | McIntire | 24/22 |
| 3,192,587 | 7/1965 | White | 24/200 |
| 3,414,943 | 12/1968 | Hattori | 24/74 A |

FOREIGN PATENTS OR APPLICATIONS

| | | | |
|---|---|---|---|
| 629,229 | 9/1949 | Great Britain | 248/358 AA |

*Primary Examiner*—Laramie E. Askin
*Attorney*—Richard C. Sughrue et al.

[57] ABSTRACT

A strapping fastener for holding twisted ends of a length of plastic strapping around a bundle of electrical conductors is formed of a rectangular parallelopipedal block of electrically insulating plastic material having two through-holes for the strapping and a cross slot for twisted strapping ends. The plastic strapping is generally rectangular in section and the through-holes in the fastener are parallel and of slightly larger section dimension to accommodate the strapping fed therethrough without twisting. The cross slot is in one face of the fastener block extending perpendicular to the through-holes so that the twisted ends of the plastic strapping will be held in their twisted position thereby preventing the strapping from slipping out of the fastener. The fastener is adapted to be used in a fastening system using an apparatus as disclosed in U. S. Pat. No. 3,633,633.

2 Claims, 4 Drawing Figures

PATENTED MAR 20 1973  3,721,750

STRAPPING FASTENER

CROSS REFERENCE TO RELATED APPLICATIONS

This application is a division of my application Ser. No. 6,084 filed Jan. 27, 1970, now U.S. Pat. No. 3,633,633 granted Jan. 11, 1972, which in turn is a continuation-in-part of my application Ser. No. 831,527, filed June 9, 1969, now abandoned.

BACKGROUND OF THE INVENTION

1. Field of the Invention

This invention relates to improvements in fasteners for plastic strapping of the type used to tie a bundle of wire or the like.

2. Prior Art

Strapping fasteners for fastening strapping applied to various articles are known in the art, e.g., belt buckles, steel strapping ties, etc. Of course metal strapping and fasteners therefor are entirely unsuitable for tying together in neat bundles a number of electrical conductors such as are common in data processing equipment, communications equipment and the like. The strapping and fasteners in these electrical arts should not be of metal.

It is also known to tie bundles of electrical conductors using a plastic strapping material and either a separate fastener or an integral fastener for connecting the ends of the tie. The integral fasteners are molded integrally on the end of a short discrete strap. Molding of the strap and integral fastener is expensive. The construction is also wasteful of strapping material because all of the straps are of finite length and the bundles of wires to be tied are of different size requiring different lengths of strapping. Even more important is the fact that the integral fastener type straps are applied manually, considerably slowing their application, and significantly adversely affecting the economics of their usage.

Another type of electrical conductor strapping device known in the art utilized metal staples as a fastener for the strapping material, but the strapping material was not securely held by such fasteners. This device was also unsuccessful due to the use of metal and an expensive, unreliable and complex design.

SUMMARY OF THE INVENTION

This invention resides in a strapping fastener for use on the strapping applying apparatus disclosed in U.S. Pat. No. 3,633,633 granted Jan. 11, 1972.

The unique strapping fastener is in the form of an easily moldable plastic member which is generally rectangular parallelopipedal block shaped with two through-holes extending through it. These passages are shaped slightly larger than a section of the rectangular sectioned strapping to accommodate the strapping fed around the bundle and back through the fastener without twisting. On the side of the fastener which is positioned away from the bound bundle there is a transverse slot extending across the face of the fastener element at 90° to the hollow tubular passages for the strapping. This slot is for accommodating the twisted ends of the strapping and holding the strapping by its ends after it is placed around the conductors.

DESCRIPTION OF THE PREFERRED EMBODIMENT

A strapping apparatus as shown in my prior U.S. Pat. No. 3,633,633 is utilized for semi-automatically placing plastic strapping S of rectangular section $S_s$ around a bundle of electrical conductors C such as are common in communication, data processing and like complicated equipment. The strapping is automatically held at both ends $S_e$ in a unique molded plastic strapping fastener 20, see FIGS. 1 and 2. The strapping ends $S_e$ are twisted so that they may be retained by the strapping fastener 20. The strapping is of a plastic material which is flexible but will take a permanent set when overtwisted axially. One such plastic material which is suitable is sold by E.I. duPont de Nemours Corp. under the trademark "DYMETROL nylon."

Figure 2:
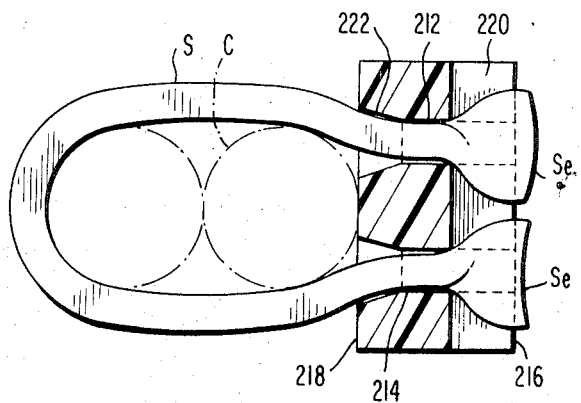
FIG. 2 is a sectional view of the fastener with strapping therein extending around and binding conductors.

The strapping fastener 20 is molded from a rectangular parallelopipedal shaped block 210 of plastic material having electrical insulating properties and is formed with a pair of spaced parallel passages or throughholes 212 and 214 extending through the block from one face 216 to an opposite face 218. As shown in FIG. 2, block face 218 is adjacent the bound conductors C. The through-holes 212 and 214 are rectangular in plan, see FIG. 4, and are slightly larger in sectional shape than the strapping section $S_s$ so that the through-holes 212 and 214 accommodate the strapping fed through them without twisting. As disclosed in my U.S. Pat. No. 3,633,633, the strapping may be fed from face 216 through hole 212 around the bundle of conductors C back through 214 from face 218 and both ends of the strapping $S_e$ are twisted about 90° as can be seen in FIG. 2. Because the through-holes 212 and 214 are slightly larger than a section of the strapping S and the section of strapping S is rectangular in section, the through-holes are also rectangular in section having a width $T_w$ greater than their length $T_l$.

Figure 3:
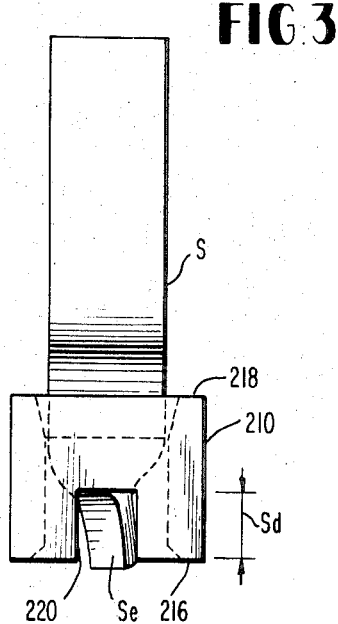
FIG. 3 is an end elevational view of the fastener and strapping of FIG. 2.
Figure 4:
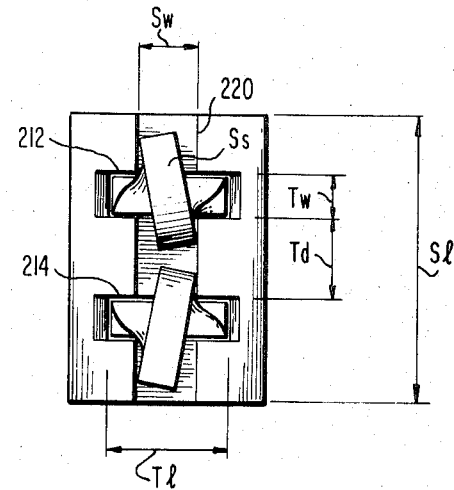
FIG. 4 is a plan view of the fastener and strapping shown in FIG. 2.

The block 210 is also formed with a single transverse or cross slot 220 extending completely across the length $S_l$ of the block. The slot 220 includes a central portion 227 between through-holes 212 and 214 and end portions 229. The parallel through-holes 212 and 214 are spaced apart a distance $T_d$ greater than their width $T_w$ so that when the strapping ends $S_e$ are twisted as shown in FIG. 2, they may rest in the slot 220 without interfering with each other. As shown in FIG. 4, the width $S_w$ of slot 220 is less than the length of the through passage $T_l$ and the width of a section of strapping so that the strapping may not untwist. Also, as shown in FIGS. 3 and 4, the depth of slot 220, $S_d$, is greater than the width of the through passages $T_w$ so that the sides of the slot can contact the twisted strapping ends $S_e$ if the strapping should start to untwist.

Figure 1:
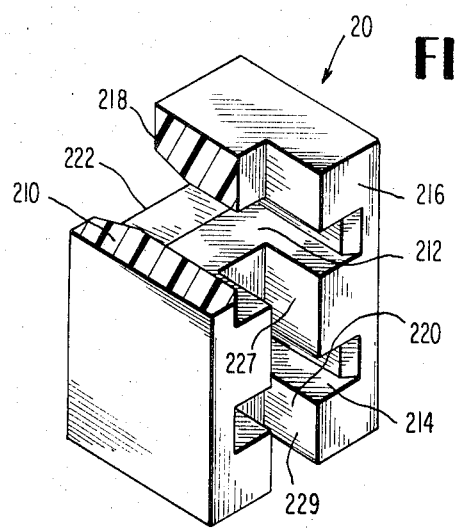
FIG. 1 is a perspective view of the fastener of this invention with portions broken away for clarity.

Tapered walls 222 at the end of through passages 212 and 214 adjacent face 218 are provided to accommodate the strapping as shown in FIG. 1 and to better guide the free end of the strapping into the through passages. Similar tapered walls are provided on the short sides of the through passages adjacent face 216 as shown in FIG. 1.

I claim:

1. A plastic fastener for holding plastic strapping (S) of rectangular section (Ss) by twisted ends (Se) thereof, the fastener comprising: a generally rectangular parallelopipedal shaped block (210) of plastic electrically insulating material, only a pair of spaced parallel through holes (212, 214) extending completely through the block from one surface (216) to an opposite surface thereof (218), the through holes being rectangular in plan (FIG. 4) having a length (Tl) and width (Tw) complementary to and just slightly larger than the rectangular section of the plastic strapping, the through holes being spaced apart a distance (Td) greater than their width (Tw), a cross slot (220) in one surface of the block extending transverse to and across the length of the through holes intermediate such length, the cross slot extending completely across the surface of the block (Sl), the cross slot having a width (Sw) substantially less than the length (Tl) of the rectangular plan of one through hole, and a depth (Sd) greater than the width (Tw) of the rectangular plan of one through hole.

2. A plastic fastener as in claim 1 wherein the edges of the through holes at the surface of the block opposite the cross slot are tapered so that entrance to the through holes at this surface of the block is larger than the plan of the through holes.

* * * * *